(12) United States Patent
Sato (10) Patent No.: US 6,563,306 B2
(45) Date of Patent: May 13, 2003

(54) METHOD AND APPARATUS FOR DETECTING DISPLACEMENT OF A MAGNET MOVED IN RESPONSE TO VARIATION OF A PHYSICAL CHARACTERISTIC OF A FLUID

(75) Inventor: Kenji Sato, Yokohama (JP)

(73) Assignee: Tokyo Keiso Kabushiki-Kaisha, Tokyo (JP)

( * ) Notice: Subject to any disclaimer, the term of this patent is extended or adjusted under 35 U.S.C. 154(b) by 0 days.

(21) Appl. No.: 09/887,435

(22) Filed: Jun. 25, 2001

(65) Prior Publication Data

US 2002/0005715 A1 Jan. 17, 2002

(30) Foreign Application Priority Data

Jul. 13, 2000 (JP) ........................................ 2000-212774

(51) Int. Cl.$^7$ ............................ G01B 7/14; H01L 43/06; G01F 23/00
(52) U.S. Cl. .............................. 324/207.2; 324/207.24; 73/313
(58) Field of Search ........................ 324/207.2, 207.21, 324/207.24, 207.25; 338/32 H, 32 R; 73/308, 313, 314; 327/510, 511

(56) References Cited

U.S. PATENT DOCUMENTS 5,003,363 A * 3/1991 Lachmann ............... 324/207.2

* cited by examiner

Primary Examiner—Walter E. Snow
(74) Attorney, Agent, or Firm—Israel Gopstein (57) ABSTRACT

An apparatus for detecting the displacement of a magnet is to be provided. The errors on the detected value due to the variation of temperature or that with time are hardly caused in the apparatus. The apparatus can detect the displacement in high resolution and precision. The apparatus is simple in its structure, and it can be expected that the apparatus can be manufactured in low cost. The apparatus is not limited in its application by the range of the displacement of the magnet. Further, a method for detecting the displacement of a magnet will be provided. An apparatus for detecting the displacement of a magnet M, the apparatus being characterized in that it further comprises a plurality of hall devices H0–H7 disposed in a predetermined spacing DP along a displacing path of the magnet in parallel thereto, wherein each of said hall devices includes a magnetically sensitive surface HS through which a magnetic flux from said magnet M permeate to generate an output the polarity and the voltage of which are depend on the direction and the density of the magnetic flux, and said magnetically sensitive surface HS of each hall device is disposed in a predetermined distance from the displacing path of the magnet M in parallel with the direction defined by the magnetic poles, and wherein > two adjacent hall devices inverted in the polarity of their output voltages are detected to determine the general position of the magnet, and the precise position of the magnet between these two hall devices is determined on the basis of the output voltages.

10 Claims, 10 Drawing Sheets

METHOD AND APPARATUS FOR DETECTING DISPLACEMENT OF A MAGNET MOVED IN RESPONSE TO VARIATION OF A PHYSICAL CHARACTERISTIC OF A FLUID

BACKGROUND OF THE INVENTION

1. Technical Field

The present invention relates to an apparatus and a method for electrically detecting the displacement of a magnet moved in response to variation of a physical quantity, the method being applicable to measuring instruments such as flowmeters or level gauges, more particularly to a displacement detecting method and apparatus using the same for transforming the displacement of the magnet through hall devices into a corresponding electrical signal.

2. Description of the Prior Art

In the art of industrial flowmeters or level gauges, used broadly are displacement detecting apparatus of a type including a magnet adapted to be displaced within a sealed chamber in response to the variation of the measured physical quantity (e.g. the flow rate or the height of the liquid). The measurement of such displacement of the magnet is effected externally of the chamber. Such a detecting apparatus detects the magnetic lines of flux from the moving magnet.

Figure 17:
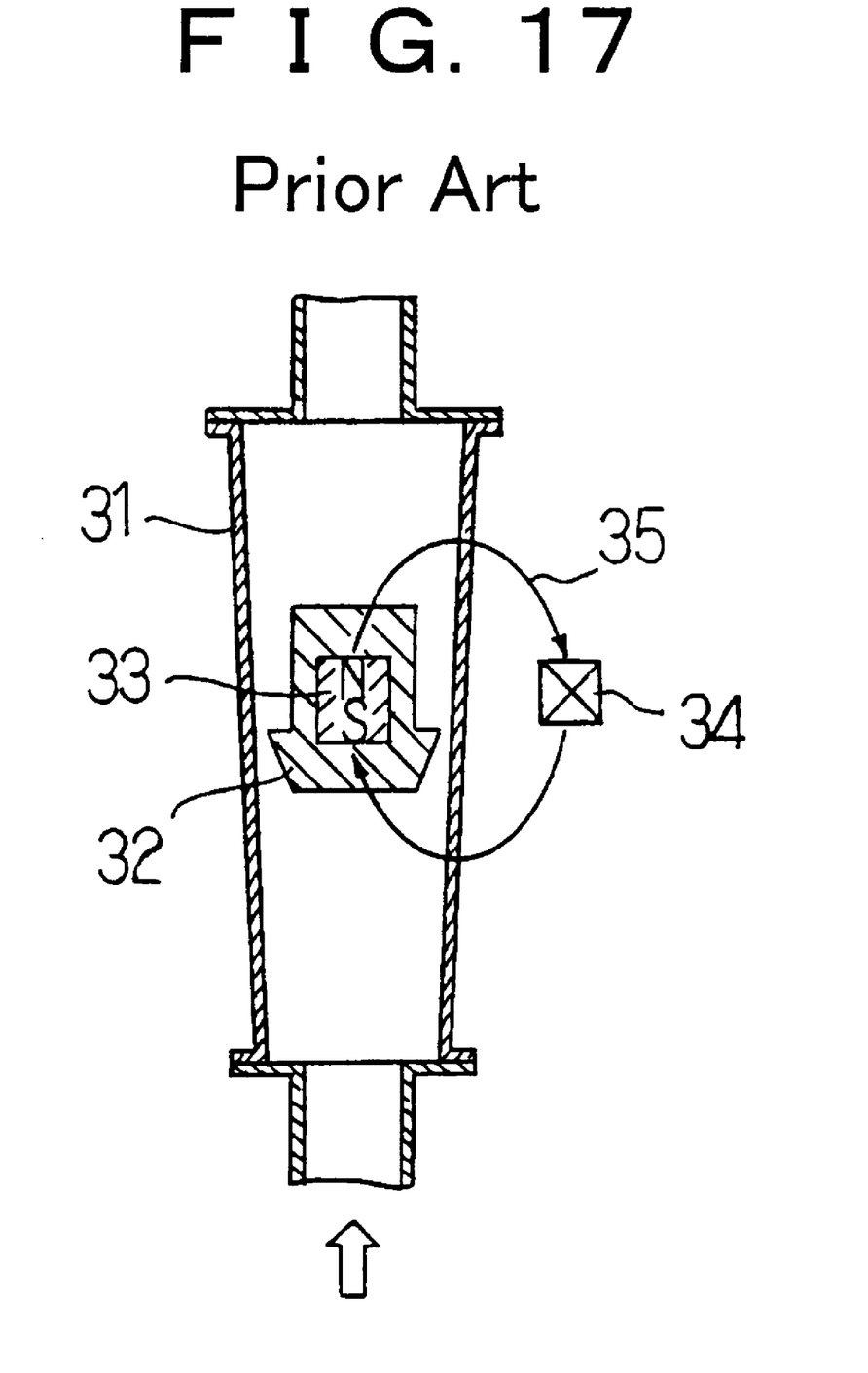
FIG. 17 is a longitudinal cross-sectional view showing an example of an area flowmeter to which is incorporated a displacement detecting apparatus according to the method of the prior art.

One example of an area flowmeter including the above mentioned detecting apparatus of the prior art is illustrated in FIG. 17. The flowmeter includes a measuring tube 31, a moving element 32 (referred generally to be a float) adapted to be moved vertically within the tube in response to the variation of the fluid to be measured, a magnet 33 mounted within the moving element, and hall device 34 provided around the measuring tube 31.

The density of the magnetic flux 35 from the magnet 33 and permeating through the hall device 34 varies upon moving the magnet 33 vertically in accordance with the variation of the flow rate of the fluid to be measured. Thus the flow rate of the fluid or the displacement of the moving element can be determined by the output voltage from the hall device varying in accordance with the variation of the density of the magnetic flux.

However, in the detecting apparatus of the type as mentioned above, the larger the distance between the hall device 34 and the magnet 33, the lower the output voltage from the hall device. This will increase the measuring error, so that the correct detection on the position can not be expected. In other words, the detecting apparatus of the prior art can be used only in the case that the range of the movement of the magnet is limited.

The influence of the variation of temperature and that with time on the output of the hall device 34 and/or on the density of the magnetic flux generated from the magnet 33 will also be the obstruction against the proper detection.

The detecting apparatus of the other prior type including a plurality of hall devices provided linearly and in parallel with the direction of the movement of the magnet can also be used.

However, in such apparatus, each hall devices are used as the proximity switch, and the position of the magnet is adapted to be detected on the basis of the position of the hall device outputting the voltage higher than the predetermined threshold value.

The detected value on the position of the magnet will be output in the form of the digital data, so that the influence caused by the variation of temperature and that with time will be improved. Thus, the disadvantages inherent in the apparatus shown in FIG. 17 are improved. Nevertheless, the resolution of the apparatus of the prior art is merely about equal to or half of the spacing between the magnetic sensors such as hall sensors. In this connection, if it is desired to detect the displacement more precisely, it is necessary to increase the number of the hall device and to make the distance between adjacent hall devices narrower. This will also increase the cost for the apparatus.

The spacing between adjacent hall devices must be sufficiently larger relative to the size of each hall device, so that it is necessary to make the amplitude of the displacement of the magnet larger in order to provide a plurality of hall devices to achieve high resolution.

Accordingly the object of the present invention is to provide an apparatus and a method for detecting the displacement of a magnet solved in the problem inherent in the apparatus of the prior art. In accordance with the present invention, the errors on the detected value due to the variation of temperature or that with time are hardly caused in the apparatus. The apparatus can detect the displacement in high resolution and precision. The apparatus is simple in its structure, and it can be expected that the apparatus can be manufactured in low cost. The apparatus is not limited in its application by the range of the displacement of the magnet.

SUMMARY OF THE INVENTION

These and other objects are achieved by a method, and an apparatus employing the method, for detecting the displacement of the magnet, the method being characterized by disposing a plurality of hall devices in a predetermined spacing along a path of displacement of the magnet in parallel thereto, each of the hail devices including a magnetically sensitive surface through which a magnetic flux from said magnet permeates to generate an output signal having a polarity and magnitude which are dependent on the direction and the density of the magnetic flux, and wherein said magnetically sensitive surface of each said hail device is disposed in parallel with the direction defined by the magnetic poles of said magnet, detecting two adjacent hail devices having output signals of opposite polarities to determine the general position of the magnet, and then determining the position of a center line of the magnet between these two hail devices on the basis of the magnitudes of the output signals of these two hall devices.

The method is further characterized by disposing a plurality of hail devices in a predetermined spacing DP along a path of displacement of the magnet in parallel thereto, each of the hall devices including a magnetically sensitive surface through which a magnetic flux from said magnet permeate to generate an output signal having a polarity and magnitude which are dependent on the direction and the density of the magnetic flux, and wherein said magnetically sensitive surface of each said hall device is disposed in parallel with the direction defined by the magnetic poles of said magnet, detecting a pair of adjacent (n)th and (n+1)th hall devices (n=0, 1, 2, . . . ) having output signals V(n) and V(n+1) of opposite polarities to determine a general position of the magnet, and then determining a position of a center line of the magnet MP relative to a position of (0)th hail device as a reference point on the basis of the following equation $$MP = n \cdot DP + [V(n)/\{V(n)-V(n+1)\}] \cdot DP.$$

An apparatus in accordance with the method of the invention is characterized by an arrangement which comprises a plurality of hail devices disposed in a predetermined spacing DP along a displacing path of the magnet in parallel thereto, wherein two adjacent (n)th and (n+1)th hail devices (n=0, 1, 2, . . . ) inverted in the polarity of their output voltages V (n) and V (n+1) are detected to determine the general position of the magnet, and the precise position of the magnet between these two hail devices is determined on the basis of the following equation;

$$MP = n \cdot DP + [V(n)/\{V(n) - V(n+1)\}] \cdot DP$$

BRIEF DESCRIPTION OF THE DRAWINGS

Further feature of the present invention will become apparent to those skilled in the art to which the present invention relates from reading the following specification with reference to the accompanying drawings, in which:

FIG. 3($a$) is a diagrammatic view showing the basic structure of the displacement detecting apparatus according to the method of the present invention;

FIG. 3($b$) is a graph showing the correlation between the position of each device and the output voltage thereof;

DETAILED DESCRIPTION OF THE PRESENT INVENTION

A method for detecting the displacement in accordance wit the present invention and an apparatus according thereto will now be described with reference to the attached drawings.

At first, the basic principle of the method for detecting the displacement in accordance with the present invention will be described with reference to FIGS. 1–3.

Figure 1:
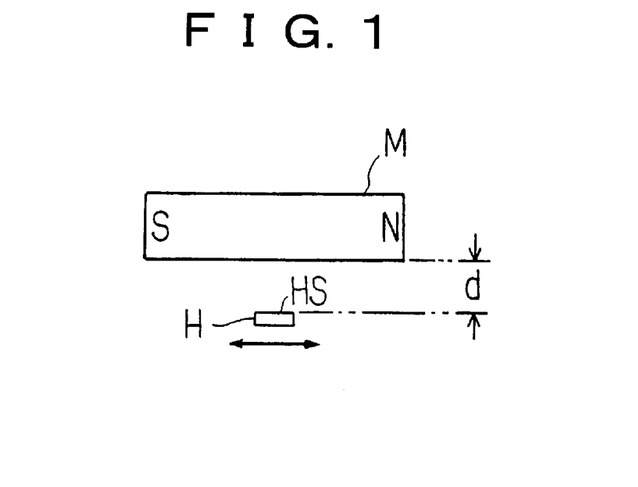
FIG. 1 is a diagrammatic view showing the positional relation between the magnet and the hail device in the displacement detecting apparatus of the present invention.

As shown in FIG. 1, a hall device HS is disposed relative to a magnet M so that a magnetically sensitive surface thereof is in parallel relation with the direction defined by magnetic poles of the magnet. Upon displacing the hall device in parallel with the direction of magnetic flux (in the direction from the left to right in FIG. 1), the output voltage will be generated in the hall device and varied as shown in the graph of FIG. 2.

Figure 2:
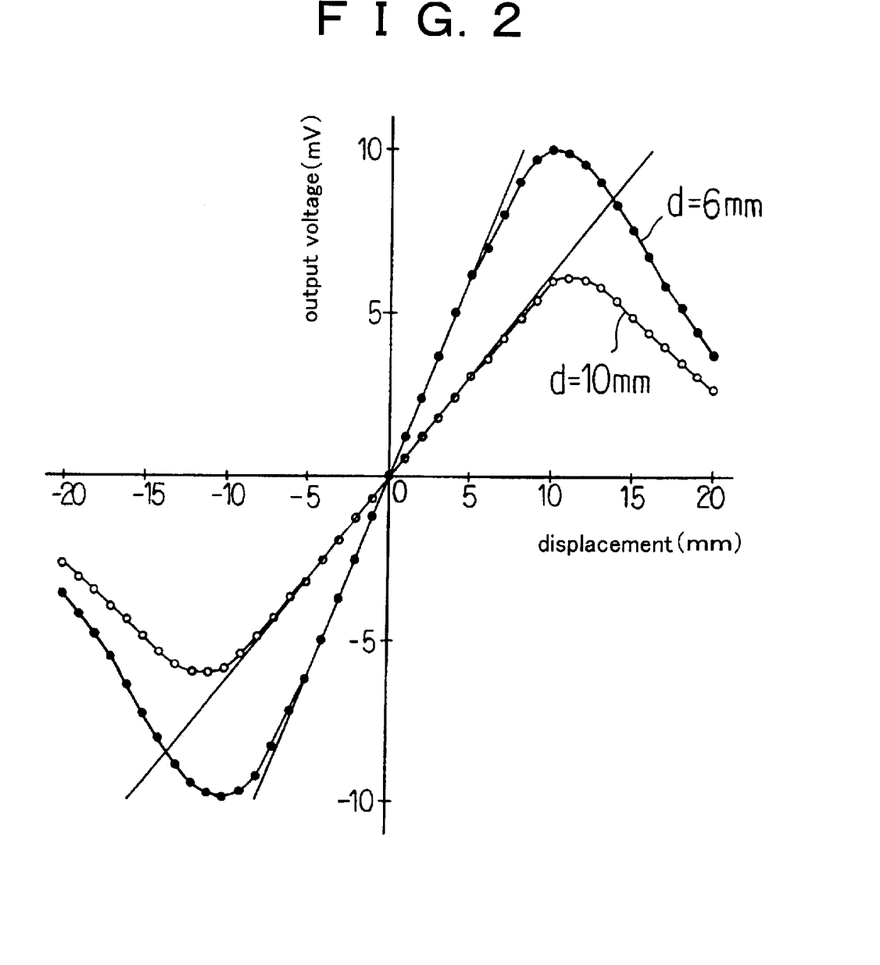
FIG. 2 is a graph showing the correlation between the relative position of the magnet and the hall device and the output voltage of the hall device.

The measured results as shown in the graph of FIG. 2 are obtained under the condition that the magnet used is the cylindrical samarium-cobalt magnet of the diameter of 10 mm and the length of 20 mm, and the distance d between the magnet M and the hall device H is 6 mm (shown by the solid circular dots in FIG. 2) or 10 mm (shown by the blanked circular dots in FIG. 2).

As can be seen from FIG. 2, the variation of the output voltage from the hall device is substantially a sine curve. In either the case of d=6 mm or d=10 mm, the variation of the output voltage in the limited range (i.e. the range from −5 mm to +5 mm in FIG. 2) of the relative displacement (the abscissa) of the magnet and the hall device is found to be the approximately straight line passing through the origin of the graph. In other words, the relative position of the hall device and the output voltage generated can be considered to be proportional with each other. In this connection, the relative position between the hall device and the magnet can be determined on the basis of the output voltage from the hall device in the above mentioned limited range (referred hereinafter to as the approximately proportional range).

However, while only one hall device is employed, the detectable range of the relative position between the device and the magnet is remained very small. Further, upon varying the output voltage from the hall detector under the effect of the variation of temperature or that with time, enormous error will rise in the result to be obtained.

Figure 3:
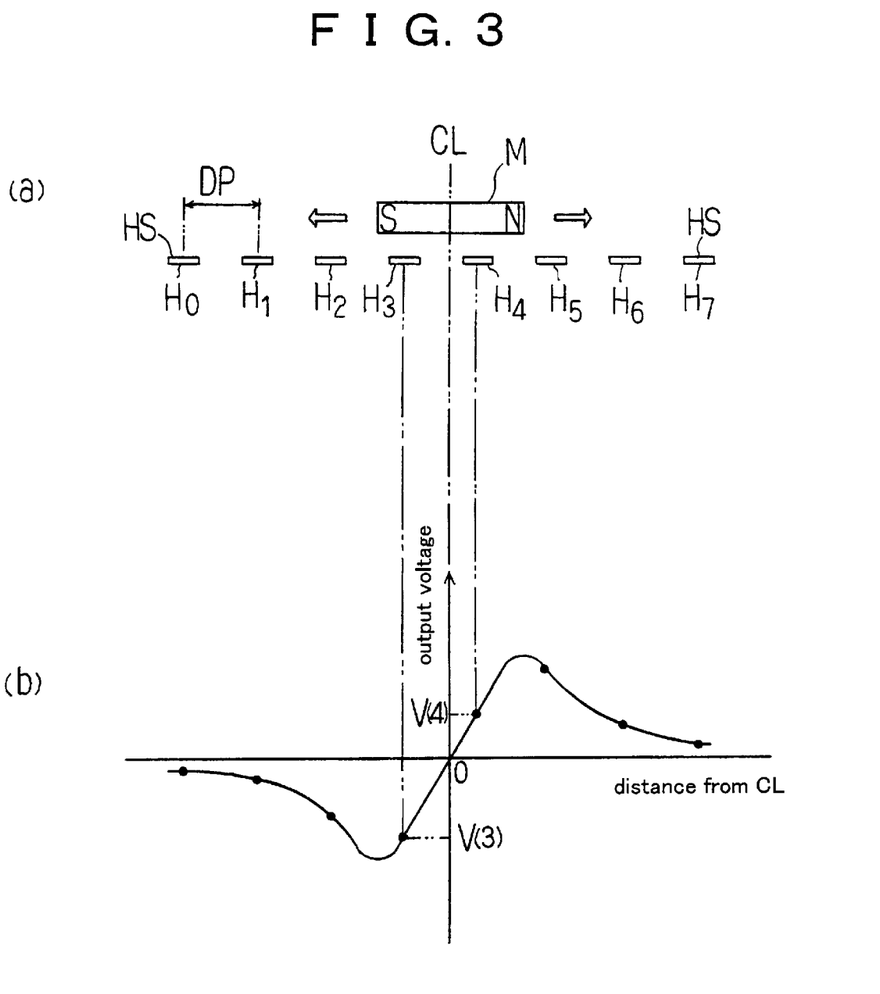

Whereas in the example of the basic structure of a detector in accordance with the present invention as shown in FIG. 3($a$), the detector includes a plurality (eight in FIG. 3($a$)) of linearly aligned equally spaced hall devices H0–H7 disposed on one same straight line extending in the direction defined by the magnetic poles of the magnet M (i.e. in the direction from left to right in FIG. 3($a$)). The spacing DP between devices is smaller than the width of the above mentioned approximately proportional range. For example, in the case that the magnet and the hall device are provided to bring the result as shown in the graph of FIG. 2, the spacing DP will be set around 10 mm.

The magnet M is adapted to be moved in the direction defined by the magnetic poles.

FIG. 3 is a graph showing the output from each hall device detected under the positional relation as shown in FIG. 3(a).

All hall devices are substantially equal in their sensitivity to the magnetic flux, and the direction of the magnetically sensitive surface of each device is identical.

As can be seen clearly from FIGS. 3(a) and 3(b), the output voltage from the hall devices positioned in the north pole side (i.e. the right side in FIG. 3(a)) of the magnet M with respect to to the center line CL of the magnet is different in its polarity from that from the hall devices positioned in the south pole side (i.e. the left side in FIG. 3(a)) of the magnet M.

The output voltage from the hall device Hn is defined to be V(n). The integer n satisfying the condition that V(n)<0 and V(n+1)>0 can be determined by detecting the output voltage from each of the hall devices H0–H7. In such an event, the center line CL of the magnet is assured to be disposed between hall devices Hn and Hn+1. The center line CL will be disposed very on the hall device Hn if the condition that V(n)=0, V(n−1)<0, and V(n+1)>0 is satisfied.

To say concretely with respect to the case shown in FIG. 3, it can be seen that the center line CL of the magnet is disposed between hall devices H3 and H4, since the polarity of the output voltage of each device is inversed between hall devices H3 and H4.

It is not necessary to detect the output voltage from each hall device simultaneously on all devices, and each output voltage from hall devices H0–H7 may be scanned sequentially.

When the magnet is positioned between hall devices Hn and Hn+1, the position of the zero-cross point of the output curve corresponds with that of the center line CL of the magnet can be obtained by making the proportional interior division on outputs V(n) and V(n+1).

Provided that the position of the hall device H0 is defined to be a reference point of the displacement MP of the magnet, the displacement MP can be calculated from the flowing equation;

$$MP = n \cdot DP + [V(n)/\{V(n)-V(n+1)\}] \cdot DP$$

In the above described method, the output voltage from the hall devices will vary under the effect of the variation of the measuring condition such as the variation of temperature or that with time, the error due to the difference in the measuring condition will be cancelled to the minimum, should the mode of variation of the property of each hall device is substantially identical.

It is desirable to reduce or eliminate the errors caused by the dispersion of the sensitivity of the hall devices, the irregularity of the spacing between devices, the unevenness of the angle of the devices, or the variation of the size or property of the magnet. There are many known countermeasures against such errors, and the error on the measured value on the displacement can be reduced by selecting and applying the suitable manner for correction.

If the position of the magnet is assured to be disposed outside of the row of hall devices, e.g. outside of the left side of the hall device H0 by that fact that V(0)>0(V(0) is the output voltage from the hall device H0), the position of the magnet can be defined as a point dividing externally of the positions of the hall devices H0 and H1. The position of the magnet can be calculated from the following equation:

$$MP = -\{(DP/2) \cdot \operatorname{Sin}(DIV \cdot \pi/2)\}$$

wherein DIV=V(0)/V(1) and V(1)−V(0)>the reference value.

If the position of the magnet is assured to be disposed outside of the row of hall devices, i.e. outside of the right side of the hall device H7 by that fact that V(7)<0 (V(0) is the output voltage from the hall device H7), the position of the magnet can be defined as a point dividing externally of the positions of the hall devices H6 and H7. The position of the magnet can be calculated from the following equation:

$$MP = 7DP + \{(DP/2) \cdot \operatorname{Sin}(DIV \cdot \pi/2)\}$$

wherein DIV=V(7)/V(6) and V(6)−V(7)>the reference value.

The above described structure is provided with 8 hall devices. The measuring range can be enlarged without affecting the precision of the measurement by lengthening the row of hall devices by adding required number of hall devices thereto.

It is necessary to provide electric current to the hall devices to bring them into operation. However, it is not necessary to supply the current to all hall devices continuously. In order to reduce the current to be consumed by the detecting apparatus, the required current may be delivered intermittently to each hall device and the output voltage derived from each hall device may be detected sequentially.

In the detecting apparatus of the structure as mentioned above, the direction defined by the magnetic poles of the magnet M is the same as that of the displacement of the magnet. In the method and the apparatus of the present invention, it is only necessary to make the direction defined by the magnetic poles to be substantially parallel to the magnetically sensitive surface of the hall devices. It is therefore possible to provide an embodiment shown in FIG. 4 wherein the direction defined by the magnetic poles of the magnet M is perpendicular to that of the displacement of the magnet, and the magnetically sensitive surface HS of each hall device H is directed perpendicular to the direction of the displacement of the magnet.

The magnet may not necessarily be displaced in a linear path. It is therefore possible to provide an embodiment shown in FIG. 5 wherein a magnet M is disposed on a peripheral edge of a disk RP to follow a circular track. It is further possible to provide an embodiment shown in FIGS. 6 and 7 wherein a ring shaped magnet RM is employed. In such embodiments, the turning angle of the ring shaped magnet around the central axis thereof is detected. In these embodiments, hall devices are disposed along a circular path defined in parallel with the circular path of the magnet. The magnetically sensitive surfaces of the hail devices are disposed to be in parallel with the direction defined by the magnetic poles of the magnet.

Figure 6:
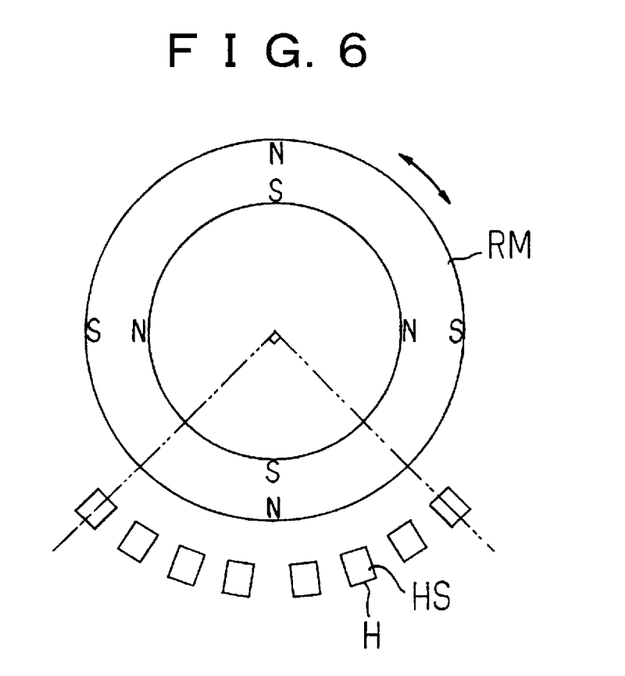
FIG. 6 is a diagrammatic view showing an additional basic structure of the displacement detecting apparatus according to the method of the present invention.
Figure 7:
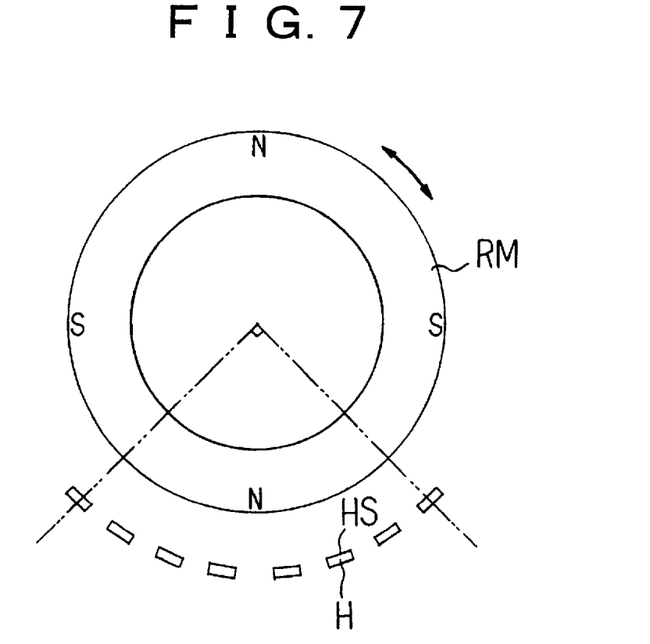
FIG. 7 is a diagrammatic view showing further additional basic structure of the displacement detecting apparatus according to the method of the present invention.

The ring shaped magnet may include alternative polarities on both of the inner and outer surfaces as shown in FIG. 6, or may include alternative polarities on the outer surfaces as shown in FIG. 7. In the embodiments as shown in FIGS. 6 and 7 wherein a plurality of magnetic poles are provided therearound, the range of the angle within which the hail devices are to be disposed (this range is referred hereinafter to as "the range of disposing angle") can be obtained by dividing 360° by the number of magnetic poles. With respect to the embodiments as shown in FIGS. 6 and 7 in which 4 magnetic poles are provided, the range of disposing angle is within 90°.

Magnets having a shape other than the ring shape, such as a prism shape or a disk shape for example, may be used.

Figure 4:
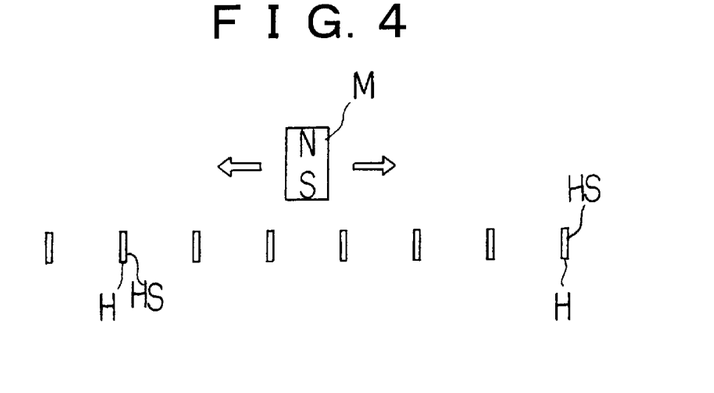
FIG. 4 is a diagrammatic view showing another basic structure of the displacement detecting apparatus according to the method of the present invention.
Figure 5:
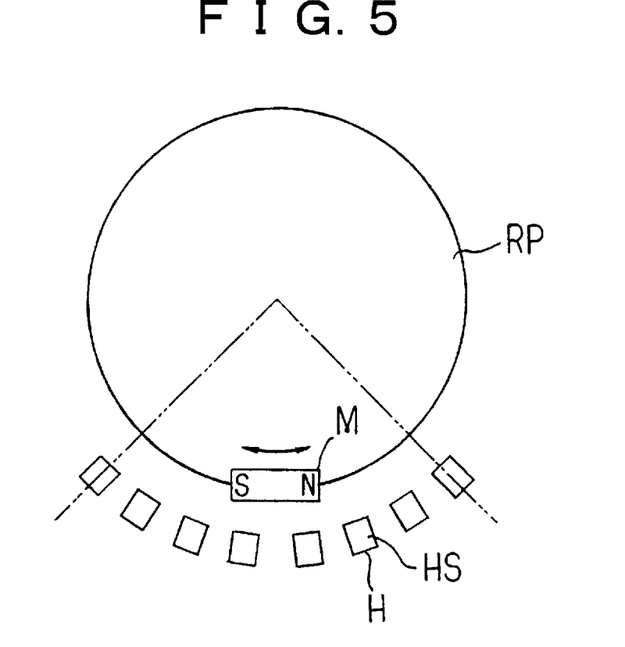
FIG. 5 is a diagrammatic view showing further basic structure of the displacement detecting apparatus according to the method of the present invention.

The principle and the equation to be applied in the embodiments shown in FIGS. 5–7 is the same as that applied in the embodiment shown in FIGS. 3 and 4.

The displacement detecting apparatus in accordance with the method of the present invention can be used in the area flowmeter for detecting the flow rate.

The flowmeter is the area flowmeter including a vertical measuring tube through which the fluid to be measured flows and a moving element accommodated within the tube. The moving element is adapted to be displaced in a vertical direction in response to the force to be applied by the fluid flowing through the tube. The flowmeter also includes a magnet adapted to be displaced upwardly or downwardly in dependence on the vertical movement of the moving element, and a plurality of hall devices generating an output voltage varying the polarity and/or the value there of in accordance with the direction and the density of the magnetic flux permeating the magnetically sensitive surfaces of the hall devices. These hall devices are disposed in parallel with the track through which the magnet is displaced. The magnetically sensitive surfaces of the hall devices are directed in parallel with the direction defined by the magnetic poles of the magnet. The hall devices are disposed with interposing a predetermined spacing therebetween. In the detecting operation, finding a pair of adjacent two hall devices generating output voltages different in their polarity to roughly estimate the position of the magnet, and then the precise position of the magnet between the two hall device is calculated from the output voltages obtained from these two hall device to deduce the amount of flow rate.

Figure 8:
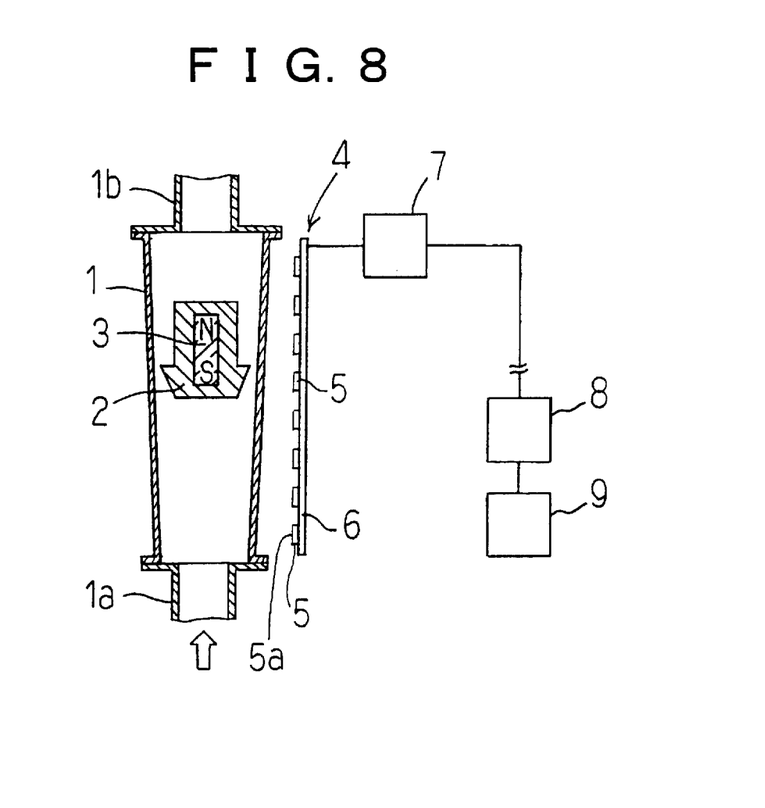
FIG. 8 is a longitudinal cross-sectional view showing an example of a flowmeter to which the displacement detecting apparatus in accordance with the method of the present invention is incorporated.

The reference numeral 1 denotes a tapered measuring tube of the downwardly convergent configuration through which the fluid to be measured flows. A moving element (sometimes referred to as a float) 2 higher in its specific gravity than the fluid to be measured is provided within the measuring tube so as to be displaceable therein. The moving element is provided with a magnet 3 the magnetic poles thereof are directed in vertical direction.

The measuring tube is made of a material permeable for the magnetic flux. An inflow tube and an outflow tube are denoted by the reference numerals 1a and 1b respectively.

The detecting apparatus body 4 in accordance with the present invention is provided on the outside of the measuring tube 1.

The detecting apparatus body is provided with print circuit board 6 on which a plurality of hall devices 5, 5 are disposed linearly on the printed circuit board 6 in parallel with the direction of displacement of the moving element 2. The magnetically sensitive surface 5a of each hall device is directed in parallel with the direction of displacement of the magnet.

The detecting apparatus body 4 includes a control circuit 7 for supplying the required current to each hall device for operating the same, and detecting the output voltage from each hall device. The detecting apparatus body is connected through the control circuit 7 to an arithmetic circuit 8 calculating the position of the magnet on the basis of the output voltage derived from each hall device, and converting thus obtained data on the position of the magnet into the value of the flow rate. The results of calculation or the flow rate obtained from arithmetic circuit 8 are displayed through output device 9.

Arithmetic circuit 8 and output device 9 are microprocessor for processing data.

In the flowmeter of the arrangement as described above, the hall devices 5, 5 of the detecting apparatus body 4 detect the magnetic flux from magnet 3 in the moving element 2 displacing in accordance with the variation of the flow rate of the fluid to be measured. The output voltage from each hall device is delivered through control circuit 7 to arithmetic circuit 8, and thus obtained value of flow rate is output from the output device 9.

Although in the embodiment described above, the arrangement in which the linear displacement of the magnet 3 is detected by a plurality of hall devices 5, 5 disposed linearly on the printed circuit board 6, i.e. the arrangement in accordance with the principle as shown in FIG. 3 is adopted, an arrangement for detecting the angular displacement by employing the arrangement as shown in FIG. 5 or an angle sensor may also be adopted. The concrete example thereof will now be described.

Figure 9:
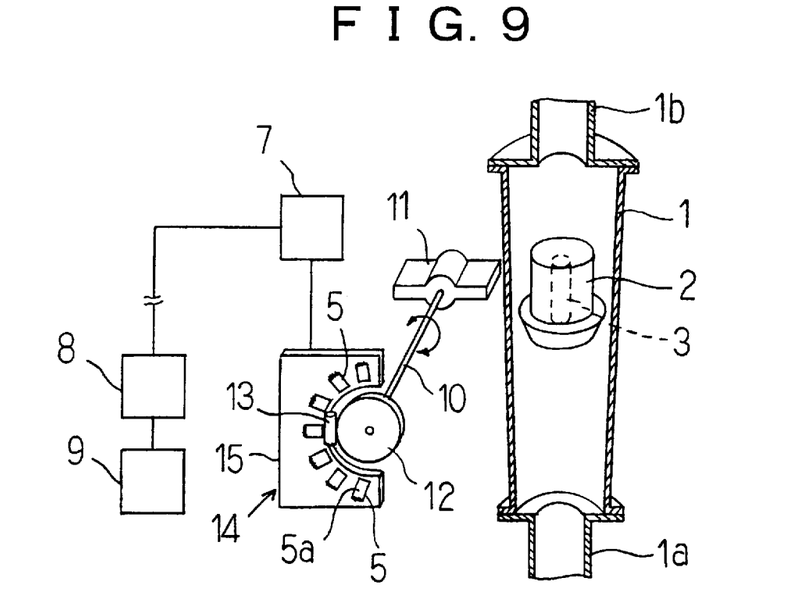
FIG. 9 is a perspective view showing another example of a flowmeter to which the displacement detecting apparatus in accordance with the method of the present invention is incorporated.

The arrangement as shown in FIG. 9 is the same as that shown in FIG. 8 in the structure of the measuring tube 1 and the moving element 2. However, in this arrangement, the linear displacement of the moving element 2 is transformed into the rotational displacement of the axis of rotation 10. The apparatus in accordance with the present invention is adapted to detect such rotational displacement.

To say concretely, the axis of rotation 10 is provided at its one end with coupling magnet 11 for urging the axis of rotation to turn it in accordance with the vertical movement of the moving element. The axis of rotation further includes at the other end thereof a disk 12 around the outer periphery thereof is provided with a rod shaped detecting magnet 13. The rotational position (the angle) of the detecting magnet 13 is detected by the detecting apparatus body 14, and the value of the flow rate can be detected from the rotational position (the angle) of the detecting magnet.

The detecting apparatus body 14 includes a plurality of hall devices 5, 5 provided on the print circuit board 15 in a predetermined spacing (or angle) therebetween. The hall devices 5, 5 are aligned in a circular row parallel with the rotational track of the detecting magnet 13.

In the flowmeter of the arrangement as described above, the magnet 3 incorporated within the moving element 2 moves in accordance with the variation of the flow rate of the fluid to be measured. The coupling magnet 11 is urged by the effect of the magnetic force of the magnet 3 to rotate around the longitudinal axis of rotation 10. The rotational angle of the axis of rotation 10 is detected by the hall devices 5, 5 of the detecting apparatus body 14 as the rotational angle of the detecting magnet 13. The output voltage derived from each hall device is delivered through the control circuit 7 to the arithmetic circuit 8, and then obtained value of flow rate is output from the output device 9.

The magnets of the shape other than the rod shape such as the ring shape or the disk shape may also be used as the detecting magnet 13. The detecting magnet can be combined with the coupling magnet 11 as shown in FIGS. 10 and 11.

Figure 10:
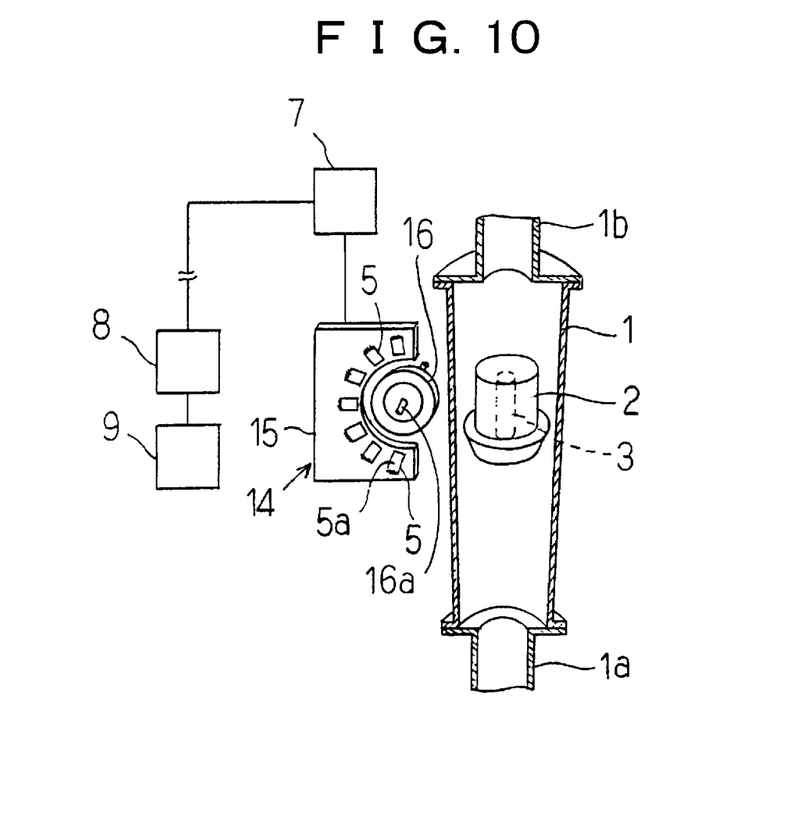
FIG. 10 is a perspective view showing further example of a flowmeter to which the displacement detecting apparatus in accordance with the method of the present invention is incorporated.

The area flowmeter as shown in FIG. 10 is provided with a ring shaped detecting magnet 16 magnetically attractive with the magnet 3 incorporated within the moving element 2. Upon displacing the moving element in the vertical direction, the detecting magnet 16 will turn around the axis of rotation 16a in accordance with the vertical motion of the moving element. The detecting magnet includes radially directed 4 poles, i.e. alternative north and south poles are provided around the outer peripheral surface of the magnet. The rotational position (the angle) of the detecting magnet 16 is detected by the detecting apparatus body 14, and the value of the flow rate can be detected from the rotational position (the angle) of the detecting magnet.

The hall devices 5, 5 of the detecting apparatus body 14 may be disposed as shown in FIG. 10 toward the radial direction with respect to the detecting magnet 16. The hall devices 5, 5 may also be disposed to opposite to the side surface of the peripheral portion of the detecting magnet 16.

Figure 11:
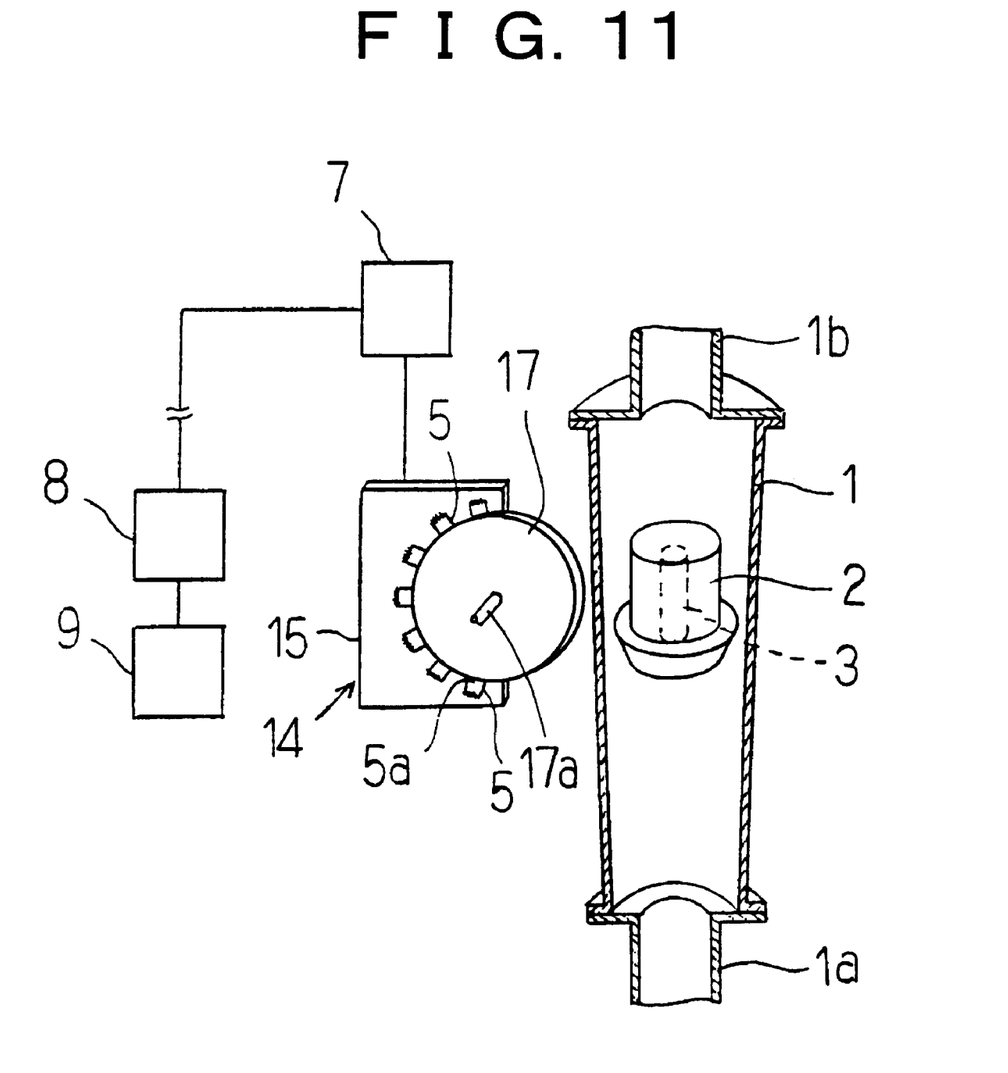
FIG. 11 is a perspective view showing an additional example of a flowmeter to which the displacement detecting apparatus in accordance with the method of the present invention is incorporated.

The area flowmeter as shown in FIG. 11 is provided with a disk shaped detecting magnet 17 magnetically attractive with the magnet 3 incorporated within the moving element 2. Upon displacing the moving element in the vertical direction, the detecting magnet 17 will turn around the axis of rotation 17a in accordance with the vertical motion of the moving element. The detecting magnet includes 4 poles provided on the planer surface of the disk, i.e. alternative north and south poles are provided on the planer surface around the outer peripheral portion of the magnet. The rotational position (the angle) of the detecting magnet 17 is detected by the detecting apparatus body 14, and the value of the flow rate can be detected from the rotational position (the angle) of the detecting magnet.

The hall devices 5, 5 of the detecting apparatus body 14 are disposed to opposite to the side surface of the peripheral portion of the detecting magnet 17.

Although the detecting magnets 16 and 17 of the flowmeters shown in FIGS. 10 and 11 include radially directed 4 magnetic poles or 4 magnetic poles provided on the planer surface of the magnet, 6 or more magnetic poles can be provided.

The displacement detector in accordance with the method of the present invention can be used in the level gauge for detecting the level of the liquid.

The level gauge in accordance with the invention includes a liquid tank and a level sensor element adapted to be moved vertically in accordance with the variation of the level of the liquid within the tank. The level gauge further includes a magnet adapted to be moved vertically in dependence on the vertical movement of the level sensor element and a plurality of hail devices provided on the exterior of the liquid tank. The polarity of the output voltage generated by the hall device depends on the direction of the magnetic flux permeating through the magnetically sensitive surface of the hail device. The voltage of the output of the hail device varies in accordance with the density of the magnetic flux. The hail devices are disposed in parallel with the track through which the magnet is to be displaced. The magnetically sensitive surfaces of the hail devices are directed in parallel with the direction defined by the magnetic poles of the magnet. The hail devices are disposed with a predetermined spacing interposed therebetween. In the detecting operation, a pair of two adjacent hail devices are found which generate output voltages of different polarities to roughly estimate the level of the liquid, and then the precise positions of the magnet between the two hail devices is calculated from the output voltages obtained from these two hall devices to deduce the amount of flow rate.

Figure 12:
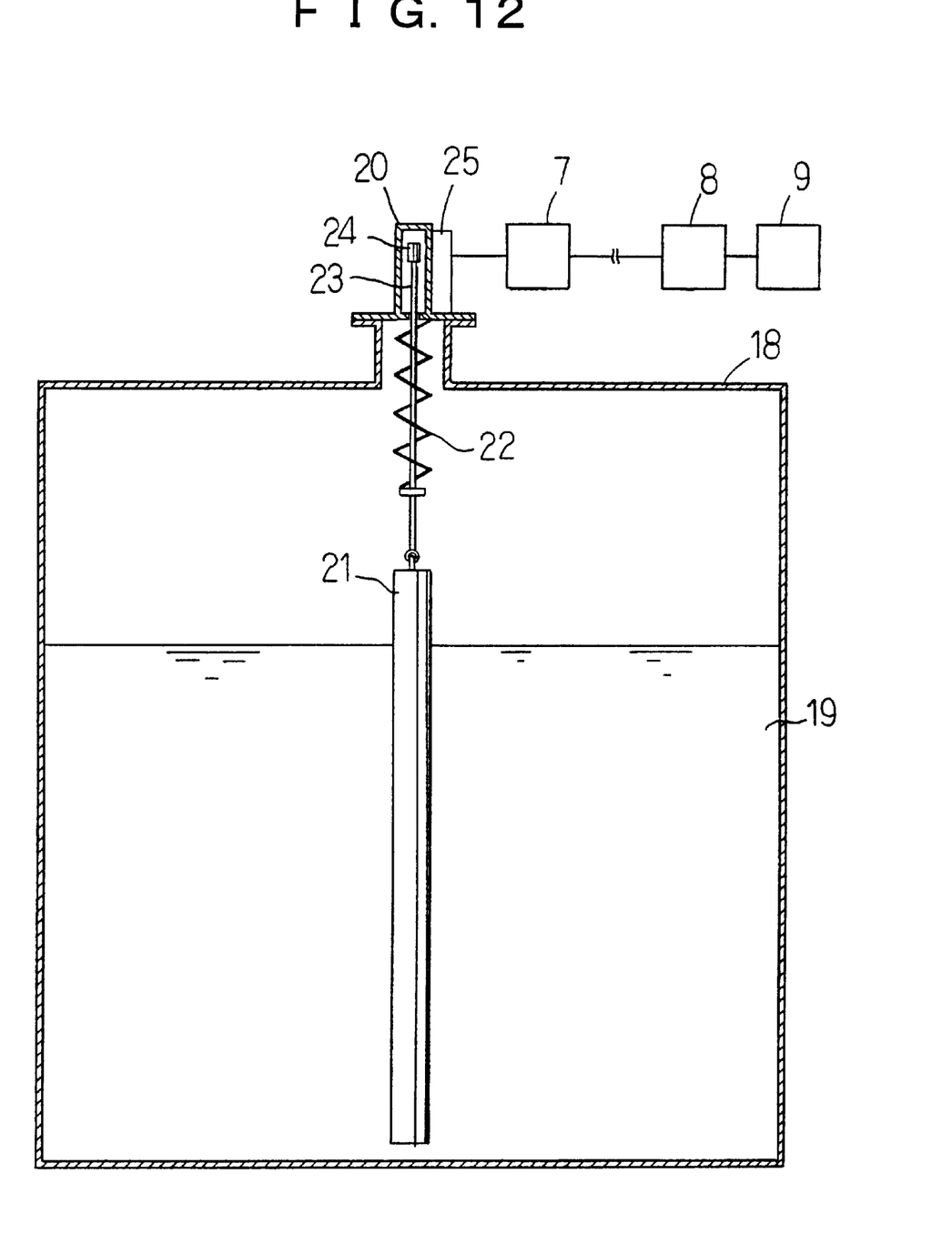
FIG. 12 is a longitudinal cross-sectional view showing an example of a level gauge to which the displacement detecting apparatus in accordance with the method of the present invention is incorporated.

The concrete example of the level gauge will now be described with reference to FIG. 12.

The reference numeral 18 denotes a liquid tank, 19 denotes a liquid, 20 denotes a sensor housing, and 21 denotes a level sensor element of the apparent specific gravity higher than that of the liquid.

The level sensor element 21 depend downwardly through detecting rod 23 by a tension spring 22 secured at its upper end on the lower surface of the sensor housing. The upper end of the detecting rod 23 extends into the interior of the sensor housing 20.

The level gauge of the structure as mentioned above is practiced as the spring balancing level gauge measuring the level of the liquid by detecting the displacement of the upper end of the detecting rod 23 within the sensor housing.

Upon rising the level of the liquid 19, the buoyancy to be act on the level sensor element 21 will increase to compress the tension spring 22 and to displace the detecting rod 23 upwardly.

In the level gauge including the level sensor of the present invention, the displacement of the displacing magnet 24 provided at the upper end of the detecting rod 23 within the sensor housing of magnetically permeable material can be detected by detecting apparatus body 25 mounted on the sensor housing. The detecting apparatus body 25 is connected through the control circuit 7 to the arithmetic circuit 8 and to an output device 9. The arithmetic circuit 8 calculates the position of the magnet from the output voltage from each hall device and convert thus obtained value of the position into the value of the liquid level. The output device 9 outputs the value of the liquid level obtained from the arithmetic circuit 8 on displays or so.

In the spring balancing level gauge of the structure as mentioned above, the amplitude of the displacement of the displacing magnet 24 can be determined by selecting the apparent specific gravity and the diameter of the level sensor element 21 and the spring rate of the tension spring 22 with taking the specific gravity of the liquid to be measured into consideration.

Even in the case that the amplitude of the variation of the level of the liquid is assumed for example to be 0 mm–3000 mm, the apparatus of the present invention can be designed to have the range of displacement of the upper end of the detecting rod or the displacing magnet is 0 mm–50 mm, so that the displacement detector of the present invention is good at its versatility.

Figure 13:
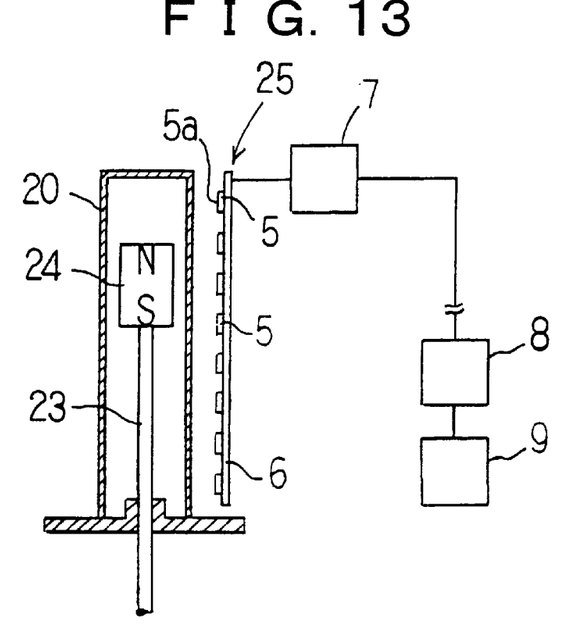
FIG. 13 is a perspective view showing an essential part of a level gauge to which the displacement detecting apparatus in accordance with the method of the present invention is incorporated.

The structure of the detecting apparatus body 25 is substantially identical with that of the detecting apparatus body of the flowmeter. To say concretely, as shown in FIG. 13, a plurality of hall devices 5, 5 are mounted linearly on the printed circuit board 6 in a predetermined spacing so as to be disposed in parallel with the moving direction of the displacing magnet 24. The magnetically sensitive surface 5a of each hall device is directed substantially in parallel with the direction defined by the magnetic poles.

The detecting apparatus body 25 is connected through the control circuit 7 providing a required current to each hall device for operating the same and detecting the output voltage from each hall device, to arithmetic circuit 8 calculating the position of the magnet on the basis of the output voltage derived from each hall device and converting thus obtained position into the value of the level of the liquid. The arithmetic circuit 8 is connected to the output device 9 for outputting the value of the level of the liquid obtained from the arithmetric circuit.

Arithmetric circuit 8 and output device 9 are in the same manner as in the area flowmeter, microprocessor for effecting processing of data.

In the level gauge of the arrangement as described above, the displacing magnet 24 is adapted to be moved vertically in accordance with the variation of the height of the fluid to be measured. The movement of the magnet is occurred in a predetermined ratio relative to the variation of the height. The hall devices 5, 5 of the detecting apparatus body 25 detect the magnetic flux generated by the magnet 24, generate outputting voltage, and deliver thus generated voltage to the control circuit 7 and the arithmetric circuit 8. The measured results are output by the output device 9.

Although in the level gauge as described above, the height of the liquid is determined by detecting the linear displacement of the displacing magnet 24 through a plurality of hall devices 5, 5 mounted linearly on the printed circuit board 6, the detector of the present invention can also be used as an angle sensor for the level gauge as in the above mentioned detector for the flowmeter. The concrete example of such an embodiment will be described with reference to FIG. 14.

Figure 14:
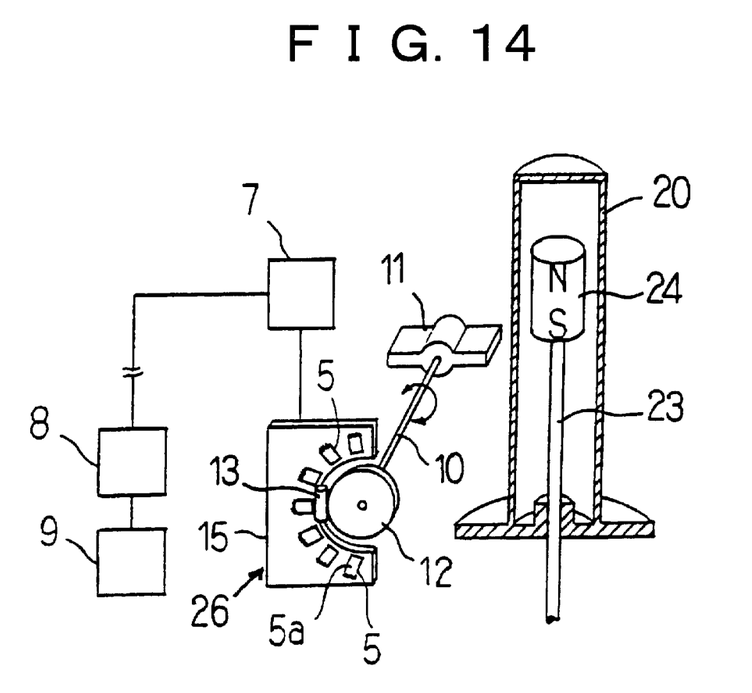
FIG. 14 is a perspective view showing another example of a level gauge to which the displacement detecting apparatus in accordance with the method of the present invention is incorporated.

The components such as the sensor housing 20 and the displacing magnet 24 shown in FIG. 14 are the same as those shown in FIG. 13. However, in this arrangement, the linear displacement of the displacing magnet 24 is transformed into the rotational displacement of the axis of rotation 10, and this rotational displacement is to be detected.

In particular, the axis of rotation 10 is provided at its one end with a coupling magnet 11 magnetically attractive with the displacing magnet 24 for urging the axis of rotation to turn it in accordance with the vertical movement of the displacing magnet. The axis of rotation further includes at the other end thereof a disk 12 around the outer periphery thereof is provided with a rod shaped detecting magnet 13. The rotational position (the angle) of the detecting magnet 13 is detected by the detecting apparatus body 26, and the value of the height of the liquid can be detected from the rotational position (the angle) of the detecting magnet.

The detecting apparatus body 26 includes a plurality of hall devices 5, 5 provided on the print circuit board 15 in a predetermined spacing (or angle) therebetween. The hall devices 5, 5 are aligned in a circular row parallel with the rotational track of the detecting magnet 13.

The detecting apparatus body 26 includes a plurality of hall devices 5, 5 provided on the print circuit board 15 in a predetermined spacing (or angle) therebetween. The hall devices 5, 5 are aligned in a circular row parallel with the rotational track of the detecting magnet 13.

In the level gauge of the arrangement as described above, the displacing magnet 24 varies the position thereof in accordance with the variation of the flow rate of the fluid to be measured. The coupling magnet 11 is urged by the effect of the magnetic force of the magnet to rotate around the longitudinal axis of rotation 10. The rotational angle of the axis of rotation 10 is detected by the hall devices 5, 5 of the detecting apparatus body 26 as the rotational angle of the detecting magnet 13. The output voltage derived from each hall device is delivered through the control circuit 7 to the arithmetic circuit 8 in the same manner as that of the level gauge of FIG. 13, and then the obtained value of the height of the liquid is output from the output device 9.

The detecting magnet 13 can not necessarily be of the rod shape, and the magnet of the ring shape or the disk shape may be used. The detecting magnet may be combined with the coupling magnet 11 as shown in FIGS. 10 and 11.

Figure 15:
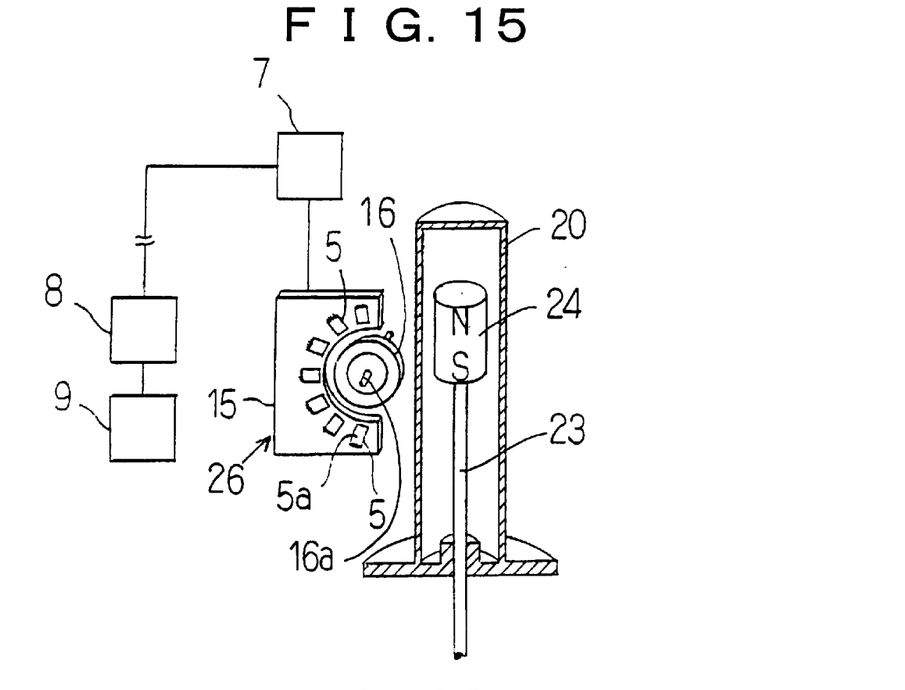
FIG. 15 is a perspective view showing further example of a level gauge to which the displacement detecting apparatus in accordance with the method of the present invention is incorporated.

The level gauge as shown in FIG. 15 is provided with a ring shaped detecting magnet 16 magnetically attractive with the displacing magnet 24. Upon displacing the moving element in the vertical direction, the detecting magnet 16 will turn around the axis of rotation 16a in accordance with the vertical motion of the moving element. The detecting magnet includes radially directed 4 poles, i.e. alternative north and south poles are provided around the outer peripheral surface of the magnet. The rotational position (the angle) of the detecting magnet 16 is detected by the detecting apparatus body 26, and the value of the height of the liquid can be detected from the rotational position (the angle) of the detecting magnet.

The hall devices 5, 5 of the detecting apparatus body 26 may be disposed as shown in FIG. 15 toward the radial direction with respect to the detecting magnet 16. The hall devices 5, 5 may also be disposed on the side surface of the peripheral portion of the detecting magnet 16.

Figure 16:
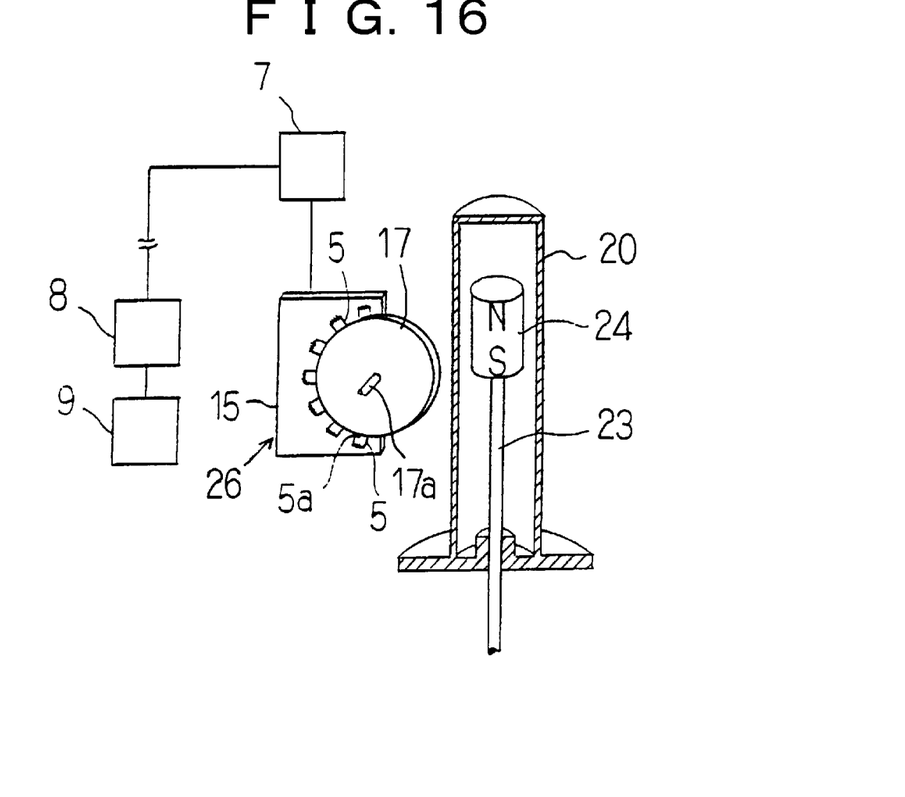
FIG. 16 is a perspective view showing an additional example of a level gauge to which the displacement detecting apparatus in accordance with the method of the present invention is incorporated.

The level gauge as shown in FIG. 16 is provided with a disk shaped detecting magnet 17 magnetically attractive with the displacing magnet 24. Upon displacing the moving element in the vertical direction, the detecting magnet 17 will turn around the axis of rotation 17a. The detecting magnet includes 4 poles provided on the planer surface of the disk, i.e. alternative north and south poles are provided on the planer surface around the outer peripheral portion of the magnet. The rotational position (the angle) of the detecting magnet 17 is detected by the detecting apparatus body 26, and the value of the height of the liquid can be detected from the rotational position (the angle) of the detecting magnet.

The hall devices 5, 5 of the detecting apparatus body 26 is disposed to opposite to the side surface of the peripheral portion of the detecting magnet 17.

Although the detecting magnets 16 and 17 of the level gauge as shown in FIGS. 15 and 16 include radially directed 4 magnetic poles or 4 magnetic poles provided on the planer surface of the magnet, 6 or more magnetic poles can be provided.

THE EFFECTS OR ADVANTAGES OF THE PRESENT INVENTION

In accordance with the present invention, the industrial measuring instruments for detecting the physical quantity to be measured as the amount of displacement of the magnet is used, and following effects or advantages can be obtained thereby.

The error in the measured value inherent in the structure of the detecting apparatus of the prior art that the distance between the magnet and the respective hall device will be varied in accordance with the position of the magnet can be eliminated by detecting the displacement of the magnet by means of a plurality of hall devices disposed along the track through which the magnet is to be moved. In other words, the distance between the magnet and the hall devices can be remained in a predetermined range.

In the method of the prior art detecting the displacement of the magnet from the output from the one hall device, the magnetic force or the output of the hall device will change under the effect of the variation of temperature or that with time, and errors are caused thereby in the measured value, so that it is difficult to make measurement in high precision. Whereas, the apparatus and the method in accordance with the present invention, the displacement of the magnet is detected by using the ratio obtained by the values of the output voltages from a plurality of hall devices, rather than using the value of the output from each hall device as it is. In this connection, provided that the property of each hall device is substantially identical and the ratio of the variation of temperature or that with time of the output voltage from each hall device is also substantially identical, the detected value does not substantially be affected by the influence of the variation, i.e. the correct detection of the displacement can constantly be effected. The displacement detecting apparatus of the present invention is especially preferable for the flowmeter or the level gauge through which the fluid liable to be effected by the temperature thereof flows.

When the range of the displacement of the magnet is relatively wide, the range to be detected can easily be enlarged by increasing the number of the hale. devices. The displacement detecting apparatus according to the method of the present invention is broad in its application.

In the prior art, a plurality of magnetic sensors such as hail sensors are provided, and the data on the displacement of the magnet are provided in digital form depending on the switching condition ("on" or "off") of each magnetic sensor, so that the resolution of the apparatus of the prior art is substantially equal to or half of the spacing between the magnetic sensors such as hail sensors. Whereas, in the displacement detecting apparatus according to the method of the present invention, the position of the magnet between two adjacent hail devices can be calculated with high resolution on the basis of the detected magnitudes of the signals output from the hail devices. In this connection, the precise detection of the displacement can be effected by using fewer hail devices, and the substantial improvement of the performance can be expected at low cost.

While particular embodiments of the present invention have been illustrated and described, it should be obvious to those skilled in the art that various changes and modifications can be made without departing from the spirit and scope of the invention.

What is claimed is:

1. An apparatus for detecting the displacement of the magnet, the apparatus being characterized in that it further comprises a plurality of hall devices disposed in a predetermined spacing DP along a displacing path of the magnet in parallel thereto, wherein
    each of said hall devices includes a magnetically sensitive surface through which a magnetic flux from said magnet permeate to generate an output the polarity and the voltage of which are depend on the direction and the density of the magnetic flux, and said magnetically sensitive surface of each hall device is disposed in a predetermined distance from the displacing path of the magnet in parallel with the direction defined by the magnetic poles, and wherein
        two adjacent (n)th and (n+1)th hall devices (n=0, 1, 2, . . . ) inverted in the polarity of their output voltages V(n) and V(n+1) are detected to determine the general position of the magnet, and the precise position of the magnet between these two hall devices is determined on the basis of the following equation;

$$MP = n \cdot DP + [V(n)/\{V(n)-V(n+1)\}] \cdot DP.$$

2. An apparatus for detecting the displacement of the magnet, the apparatus being characterized in that it further comprises a plurality of hall devices disposed in a predetermined spacing DP along a displacing path of the magnet in parallel thereto, wherein
    each of said hall devices includes a magnetically sensitive surface through which a magnetic flux from said magnet permeate to generate an output the polarity and the voltage of which are depend on the direction and the density of the magnetic flux, and said magnetically sensitive surface of each hall device is disposed in a predetermined distance from the displacing path of the magnet in parallel with the direction defined by the magnetic poles, and wherein
        two adjacent (n)th and (n+1)th hall devices (n=0, 1, 2, . . . ) inverted in the polarity of their output voltages V(n) and V(n+1) are detected to determine the general position of the magnet, and the precise position of the magnet between these two hall devices is determined on the basis of the following equation;

$$MP = n \cdot DP + [V(n)/\{V(n)-V(n+1)\}] \cdot DP.$$

3. A method for detecting displacement of a magnet moved in response to variation of a physical characteristic of a fluid, the method being characterized by:
    disposing a plurality of hail devices at a predetermined spacing along a displacing path of the magnet and parallel thereto, each of said hail devices including a magnetically sensitive surface through which a magnetic flux from said magnet permeates to generate an output signal having a polarity and magnitude which are dependent on the direction and the density of the magnetic flux, said magnetically sensitive surface of each hall device being disposed in parallel with a direction defined by the magnetic poles of said magnet,
    detecting two adjacent hail devices having output signals of opposite polarities to determine a general position of the magnet, and then
    determining a position of a center line of the magnet between the detected hail devices on the basis of the magnitudes of the output signals from the detected hall devices.

4. The method for detecting displacement of a magnet moved in response to variation of a physical characteristic of a fluid in accordance with claim 3, wherein said physical characteristic of the fluid is a flow rate of the fluid, and including the step of applying the method in a flow meter to detect displacement of the magnet in response to variation of the flow rate of the fluid.

5. The method for detecting displacement of a magnet moved in response to variation of a physical characteristic of a fluid in accordance with claim 3, herein said physical characteristic of the fluid is a height of a liquid, and including the step of applying the method in a level gauge to detect displacement of the magnet in response to variation of the height of the fluid.

6. The method for detecting displacement of a magnet moved in response to variation of a physical characteristic of a fluid in accordance with claim 3, wherein said step of disposing a plurality of hail devices comprises setting a range of displacement to be detected by the method and including a corresponding number of ball devices in said disposed plurality of hall devices.

7. A method for detecting displacement of a magnet moved in response to variation of a physical characteristic of fluid, the method being characterized by:
    disposing a plurality of hail devices at a predetermined spacing DP along a displacing path of the magnet in parallel thereto, each of said hail devices including a magnetically sensitive surface through which a magnetic flux from said magnet permeates to generate an output signal having a polarity and magnitude which are dependent on the direction and the density of the magnetic flux, said magnetically sensitive surface of each hail device being disposed in parallel with a direction defined by the magnetic poles of said magnet.
    detecting adjacent (n)th and (n+1)th hail devices (n=1, 2, . . . ) having output signals V(n) and V(n+1) of opposite polarities to determine a general position of the magnet, and then
    determining a position of a center line of the magnet MP relative to a position of (0)th hall device as a reference point on the basis of the following equation:

$$MP = n \cdot DF + [V(n)/\{V(n)-V(n+1)\}] \cdot DP.$$

8. The method for detecting displacement of a magnet moved in response to variation of a physical characteristic of a fluid in accordance with claim 7, wherein said physical characteristic of the fluid is a flow rate of the fluid, and including the step of applying the method in a flow meter to detect displacement of the magnet in response to variation of the flow rate of the fluid.

9. The method for detecting displacement of a. magnet moved in response to variation of a physical characteristic of a fluid in accordance with claim 7, wherein said physical characteristic of the fluid is a height of a liquid, and including the step of applying the method in a level gauge to detect displacement of the magnet in response to variation of the height of the liquid.

10. The method for detecting displacement of a magnet moved in response to variation of a physical characteristic of a fluid in accordance with claim 6, wherein said step of disposing a plurality of hall devices comprises setting a range of displacement to be detected by the method and including a corresponding number of hail devices in said disposed plurality of hail devices.

* * * * *